United States Patent Office
3,146,252
Patented Aug. 25, 1964

3,146,252
ORGANIC SILICATES
Harold Garton Emblem, Grappenhall, and Earl Whiteway Fothergill, Liverpool, England, assignors to Philadelphia Quartz Company, Philadelphia, Pa., a corporation of Pennsylvania
No Drawing. Filed Aug. 21, 1961, Ser. No. 132,602
Claims priority, application Great Britain Aug. 29, 1960
8 Claims. (Cl. 260—448.8)

This invention relates to organic silicates and is more particularly concerned with processes of obtaining liquid hydrolysates of organic silicates.

Ethyl silicates have been used for binding particulate refractory material because of their ability to hydrolyse with water to give colloidal solutions of silicic acids. The hydrolysis is accelerated by the presence of acid catalysts. At appropriate concentrations a hydrolysis reaction product is obtained which can be made to gel in a short period of time. Acid hydrolysed ethyl silicate solutions are commonly employed in the foundry industry for preparing refractory moulds or refractory articles, such as crucibles, free from alkali-metals. Thus, in the manufacture of refractory bricks or crucibles powdered refractory material is mixed with the hydrolysate, a gelation accelerator, usually ammonia solution, being added to the hydrolysate immediately prior to mixing with the refractory. The mixture is formed into the desired shape and the mass left to set, a suitable gelation period being about 2 to 3 minutes. Acid hydrolysed ethyl silicate solutions are also used in the manufacture of investment moulds for the casting of metals.

Acid hydrolysed ethyl silicate solutions have a relatively short useful life. The viscosity of the solutions increases with ageing and after a relatively short time, and usually well before spontaneous gelation occurs, the solution becomes inconveniently viscous for use in the preparation of refractory slurries or mixes. Furthermore, as the age of the solution increases so does the rate of gelation of a mixture of it with a refractory material become more rapid and uncertain. Hydrolysates prepared by adding ethyl silicate in one quantity to an acidified ethyl alcohol-water mixture, for example, may have a useful life up to about two to three weeks. Other alcohols such as methyl and isopropyl alcohols may also be used as solvent, if this is desired, for the water and silicate. The useful life of a hydrolysate is dependent upon the silica content of the hydrolysate and the amount of acid used in its preparation. In particular, as the silica content of the hydrolysate is increased, the useful life is decreased.

To lengthen the useful life of ethyl silicate hydrolysates, more particularly those of high silica content, i.e., those having a silica content of over about 20%, the hydrolysis may be carried out in a so-called "two-stage process." In this process the prescribed volume of ethyl silicate is added in two separate quantities which are usually equal or approximately equal in volume. The second quantity is normally added immediately after the hydrolysis of the first portion has proceeded to completion as indicated by the rise in temperature of the mixture, hydrolysis being taken to be complete when the temperature reaches a maximum. The two-stage process of preparing ethyl silicates is described in an article entitled "Methods for the Hydrolysis of Ethyl Silicate" in The Industrial Chemist, February 1957, starting at page 55.

It is an object of the invention to provide a two-stage process for obtaining liquid hydrolysates of organic silicates, which hydrolysates have a useful life longer than those exhibited by comparable ethyl silicate hydrolysates obtained by the two-stage process.

According to the present invention there is provided a process of preparing a liquid organic silicate hydrolysate comprising making a mixture of a first silicate, water and an acid as hydrolysis accelerator, allowing the hydrolysis to proceed and subsequently adding to this mixture a quantity of a second silicate, wherein one silicate is an ethyl silicate and the other is an isopropyl silicate, or both silicates are isopropyl silicates.

The ethyl silicate preferably has a silica content of over 30% by weight, for example a content of about 40% or more. The isopropyl silicate preferably has a silica content of at least 30%, more preferably 35% or more.

Isopropyl silicate for use in the process of the invention may be prepared by methods described in our co-pending application S.N. 13,988, filed March 10, 1960, now U.S. Patent No. 3,070,861, issued January 1, 1963.

It is desirable that the amount of water used should be sufficient to completely hydrolyse both quantities of silicate; however, amounts slightly less than this may be used.

Suitable acids for accelerating the hydrolysis of the silicates are hydrochloric and sulphuric acids.

The second silicate is preferably added immediately or soon after the rate of heat generation in the exothermic hydrolysis reaction has reached its maximum, which will in most cases be indicated by the rise in temperature of the reaction mixture to a maximum. If the reaction is carried out in a water cooled reaction vessel, the rise in temperature of the cooling water may be observed to provide an indication of when the second silicate should be added. It may be desirable, especially when large volumes of reactants are used, to cool the reaction vessel during the addition of the second silicate.

The invention is illustrated by the following examples.

In the examples the isopropyl silicate used had a silica content of 38%, an orthosilicate content of 10%, and a free acid content of 0.03% as HCl. The ethyl silicate was a commercially available material having a silica content of 40% and a maximum acid content of 0.07%.

*Example 1*

340 ml. of ethyl silicate was added to a mixture of 140 ml. of the binary azeotrope of isopropyl alcohol and water, and 40 ml. of N/10 hydrochloric acid solution. As soon as the temperature of the mixture had passed its maximum, the mixture was divided into two equal parts. To one part 135 ml. of ethyl silicate was immediately added (to give Solution A) and to the other part 135 ml. of isopropyl silicate was immediately added (to give Solution B).

After standing overnight, there was less sludge in Solution B. After each solution had stood exposed to the atmosphere for four days, both solutions had increased in viscosity, but Solution A was more viscous than Solution B, and was too viscous to be used for preparing refractory slurries. After five days exposure, Solution A had gelled, but Solution B was quite fluid, and could have been used for preparing refractory slurries despite the viscosity increase. Solution B gelled six days after preparation.

*Example 2*

200 ml. of isopropyl silicate was added to a hydrolysing mixture comprising 200 ml. of isopropyl alcohol, 40 ml. of water and 10 ml. of 2 N hydrochloric acid solution. The mixture was stirred until the temperature of the mixture reached its maximum, by which time the mixture had become homogeneous, and it was then divided into two equal parts. To one part 100 ml. of isopropyl silicate was immediately added (to give Solution C), and to the other part 100 ml. of ethyl silicate was immediately added (to give Solution D).

On standing overnight, practically no sludge developed in either solution. After each solution had stood exposed for three days, both had increased in viscosity, Solution D was still workable, but solution C was very viscous and had gelled by the evening of the third day, Solution D remaining workable throughout the day, but gelled overnight.

*Example 3*

200 ml. of isopropyl silicate was added to a hydrolysing mixture, contained in a Dewar flask, comprising 200 ml. of isopropyl alcohol, 40 ml. of water and 10 ml. of 2 N hydrochloric acid solution. The mixture was stirred throughout the hydrolysis reaction which in this experiment occurred under substantially adiabatic conditions. When the temperature of the mixture had reached its maximum, there was added to it a further 100 ml. of isopropyl silicate (to give Solution E).

The above experiment was repeated but using ethyl silicate instead of isopropyl silicate, the resulting final solution being referred subsequently as Solution F.

Solution F on standing developed a considerable amount of sludge after only 3 hours and rapidly became unsuitable for use as an investment binder. In contrast, Solution E was perfectly clear and had not gelled after standing for four days.

What is claimed is:

1. A process for preparing an organic silicate hydrolysate comprising making a mixture of a first silicate, water and an acid as hydrolysis accelerator, allowing the hydrolysis of the first silicate to proceed, and subsequently adding to this mixture a quantity of a second silicate, said first and second silicates being selected from the group consisting of ethyl silicate and isopropyl silicate and at least one of said silicates is an isopropyl silicate.

2. A process as claimed in claim 1 in which said first silicate is an ethyl silicate.

3. A process as claimed in claim 1 wherein said first silicate is an isopropyl silicate.

4. A process as claimed in claim 3 in which the second silicate is an ethyl silicate.

5. A process as claimed in claim 2 wherein the ethyl silicate has a silica content of at least 30% by weight.

6. A process as claimed in claim 4 wherein the ethyl silicate has a silica content of at least 30% by weight.

7. A process as claimed in claim 2 wherein the isopropyl silicate has a silica content of at least 30% by weight.

8. A process as claimed in claim 7 wherein the second silicate is an isopropyl silicate having a silica content of at least 30% by weight.

References Cited in the file of this patent

UNITED STATES PATENTS 2,640,031    Da Fano _____ May 26, 1953

OTHER REFERENCES

Emblem: "The Industrial Chemist," vol. 33, February 1957, pp. 55–8.

Shklennik: "Liteinoe Proizvodsto," 1958, No. 9, pp. 12–14. [53 Chem. Abstracts 2070 (1959)].